United States Patent [19]

Ekström

[11] Patent Number: 5,187,651
[45] Date of Patent: Feb. 16, 1993

[54] SYSTEM FOR DISCHARGING ELECTRICAL POWER FROM A HIGH-VOLTAGE DIRECT CURRENT LINE TO LOCAL NETWORK

[75] Inventor: Åke Ekström, Ludvika, Sweden

[73] Assignee: Asea Brown Bourrc AB, Västerås, Sweden

[21] Appl. No.: 775,995

[22] PCT Filed: Jun. 15, 1990

[86] PCT No.: PCT/SE90/00425
§ 371 Date: Nov. 19, 1991
§ 102(e) Date: Nov. 19, 1991

[87] PCT Pub. No.: WO90/16104
PCT Pub. Date: Dec. 27, 1990

[30] Foreign Application Priority Data

Jun. 19, 1989 [SE] Sweden .................................. 8902204

[51] Int. Cl.[5] .................................................. H02J 3/36
[52] U.S. Cl. ................................................ 363/35; 363/36; 363/37
[58] Field of Search ........................ 363/15, 27, 28, 35, 363/36, 37, 65

[56] References Cited

U.S. PATENT DOCUMENTS

| 3,612,897 | 10/1971 | Kanngiesser | 363/35 |
| 3,942,089 | 3/1976 | Kanngiesser | 363/27 |
| 4,019,115 | 4/1977 | Lips | 363/35 |
| 4,024,451 | 5/1977 | Nishino et al. | 363/25 |
| 4,259,713 | 3/1981 | Flisberg et al. | 363/35 |
| 4,274,043 | 6/1981 | Heitz | 363/35 |
| 4,419,591 | 12/1983 | Irokawa et al. | 363/35 |
| 4,459,492 | 7/1984 | Rogowsky | 363/35 |
| 4,494,180 | 1/1985 | Streater et al. | 363/37 |
| 4,719,550 | 1/1988 | Powell et al. | 363/37 |

FOREIGN PATENT DOCUMENTS 1813843 7/1970 Fed. Rep. of Germany .
305027 10/1968 Sweden .

Primary Examiner—Steven L. Stephan
Assistant Examiner—Jeffrey Sterrett
Attorney, Agent, or Firm—Watson, Cole, Grindle & Watson

[57] ABSTRACT

A system for discharging electrical power from a high-voltage direct-current (HVDC) transmission line to a local network, utilizes a first, single-phase converter bridge comprising semiconductor switches which are energized by signals and which are de-energized solely with current zero crossing, and a first, single-phase transformer having a primary winding connected to a HVDC line and a secondary winding; a second converter bridge connected to the secondary winding; a secondary direct voltage network connected to the second converter bridge; a third converter bridge connected to the secondary direct voltage network for generating an alternating current for the local network; and the second and the third converter bridges each comprise ON/OFF controllable semiconductor switches, and the first and the second converter bridges commutate with a frequency that is 2-4 times higher than the normal frequency of the local network and the third converter bridge commutates at the normal frequency of the local network.

4 Claims, 2 Drawing Sheets

SYSTEM FOR DISCHARGING ELECTRICAL POWER FROM A HIGH-VOLTAGE DIRECT CURRENT LINE TO LOCAL NETWORK

It is become progressively more usual to utilize high voltage direct current for the purpose of transmitting electrical power over long distances, particularly because of the lower line costs achieved thereby. A large cost entailed by such systems lies in the current converters and in the transformers used. Consequently, it is not realistic to place several complete receiving stations of relatively low power along such a high voltage line.

For the purpose of discharging, i.e. tapping-off, lower powers, typically powers of less than 10% of the total power transmitted, it has been suggested that power discharge stations are connected in series in the d.c. circuit, the power discharged or tapped-off corresponding to a line voltage drop. The simplest of these solutions involves connecting a three-phase current converter bridge in series with the d.c. circuit. The converter bridge is connected directly to the three-phase network via a transformer. The bridge is line-commutated, which means that commutation of the valves is achieved with the aid of the a.c. voltage in the three-phase network.

A first drawback with systems of this kind is that line-controlled commutation requires the provision of synchronous machines, which becomes expensive in the case of small or average-size networks. A second drawback is that the transformer is expensive in relation to the power, while a third drawback is that disturbances and interference in the a.c. network can result in disturbances in the commutating process in the converter and therewith in the main network.

One object of the present invention is to provide a series energy discharge system capable of eliminating these drawbacks. Another object is to provide an energy discharge system which will enable small powers to be delivered to smaller networks in an economically viable manner. This is highly significant in the case of a public service company which can expect little understanding of its reluctance to deliver electric current to a sparsely populated area through which the cost-encumbered power line is drawn.

These and other objects are achieved in accordance with the invention by means of a system having the characteristic features set forth in claim 1.

The invention enables a small amount of energy to be taken from a large HVDC-network with the aid of relatively inexpensive components, so that the cost of said delivery is found defensible. All that need be connected to the high line voltage is a converter bridge with associated commutating equipment controlled via optical fibers from earth and the primary winding of a transformer, and within which winding all that need be accommodated is a voltage drop which corresponds to the power discharged or tapped off.

In order to form the concepts, there can be imagined a case which involves an HVDC-network of known kind with a voltage of ±500 kV and a maximum current of 1600 A. Connected to a conductor in this network is a first converter bridge and the primary winding of a transformer. Both may be single-phase. The primary winding must be capable of withstanding the whole of the maximum current of 1600 A and shall be insulated for 500 kV against the transformer core. On the other hand, it is not necessary to place over the winding more than one voltage corresponding to the power discharged, e.g. a maximum of 50 kV at a maximum power of 80 MW. The cost of the transformer can also be lowered, if the alternating current taken out is given a higher frequency than the normal network frequency, e.g. a frequency of 120–150 Hz. There can then be taken from the secondary side of the transformer, e.g. 40 kV, 2 kA, which is rectified to a local d.c. voltage of 40 kV in a second converter, which is assumed to be force commutated. Preferably, a three phase voltage is produced from this d.c. voltage by conversion in a third converter, which converter may be force commutated to a network frequency of 50 or 60 Hz, according to the case in question, at a voltage suitable for local transmission.

The local d.c. network is preferably made voltage-stiff with a capacitor and may be provided optionally with an accumulator battery for temporary energy storage. The power output is preferably controlled by sensing the local d.c. voltage, which tends to fall with increased power output via the third converter, and by controlling the commutation for the first and the second converters in a manner to obtained the desired local d.c. voltage.

The second and the third converters are suitably constructed with extinguishable valves, e.g. GTO-thyristors, whereas the first converter preferably includes thyristors of the kind which are extinguished by zero crossing.

The HVDC-network will suitably include filter circuits operative to eliminate harmonics generated by the power discharge.

The cost of the discharge station will be moderate, particularly since the voltage between the two commutator risers from the high voltage line is relatively low, thereby even enabling the commutator risers to be taken to the converter transformer between the first and the second converter bridge, via a common porcelain insulator.

An exemplifying embodiment and a number of variants thereof will now be described with reference to the accompanying drawings In order not to encumber the description with details of known techniques concerning high voltage direct current transmission (HVDC), reference is made to the monograph literature in the field, such as E Uhlmann Power Transmission by Direct Current (Springer Verlag 1975).

Figure 1:
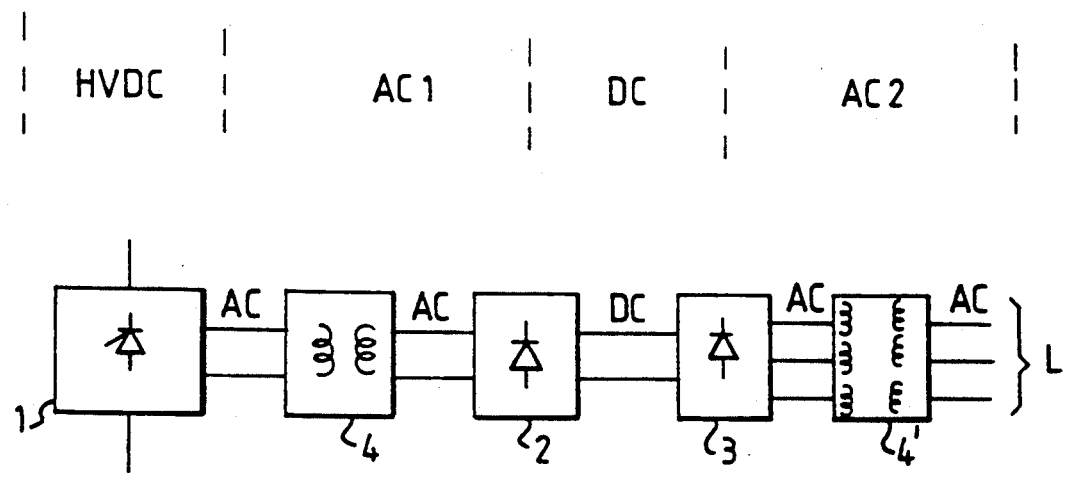
FIG. 1 is a block schematic of a system constructed in accordance with the principles of the invention.

The block schematic shown in FIG. 1 illustrates the principal construction, with four mutually different voltage systems, namely the HVDC-system of the line from which energy is discharged, i.e. tapped-off, which system can lie on, e.g. 500 kV, a first alternating current system AC1, which preferably has a system frequency which is 2–4 times higher than the standard network frequency, a direct voltage system DC, e.g. on 40 kV, and a second alternating current system AC2 which has the network frequency and which is intended to supply/constitute a local distribution network. Energy is transmitted between these systems through converter bridges. Although the first alternating current system may be a single-phase system, it can also be a three-phase network, as illustrated in FIG. 2.

For the purpose of providing a wide power-discharge control range, it may also be expedient to incorporate in the high voltage direct current line a plurality of activatable and deactivatable converter bridges each functioning to deliver a respective alternating current, the powers of which are combined, e.g. by supplying said currents each to a respective primary winding in the first transformer. By suitable dimensioning, it is possible, in this way, to avoid excessively large ignition angles for the rectifying thyristors and the well-known problems associated with such angles.

Obviously, a single-phase network will be the cheapest, since only four thyristor arrays are required on the high voltage side, these thyristors needing only to withstand the maximum voltage drop of the high voltage current over the actual system, and only one high-voltage insulated winding in the transformer 4. This involves a question of dimensioning, and in certain instances it is possible, as illustrated in FIG. 2, to connect several converters 1, 1' in series when the power discharged or tapped-off increases, and to effect more expensive twelve-pulse commutation, etc., in accordance with prevailing requirements. However, in the case of moderate to small power discharges, it is preferred to work with a single-phase and a frequency of 120–150 Hz, since the transformer 4 can be made less expensive in this way. The frequency can also be made in this way. The frequency can also be made variable, so as to enable the power discharged, or tapped-off, to be controlled.

Figure 2:
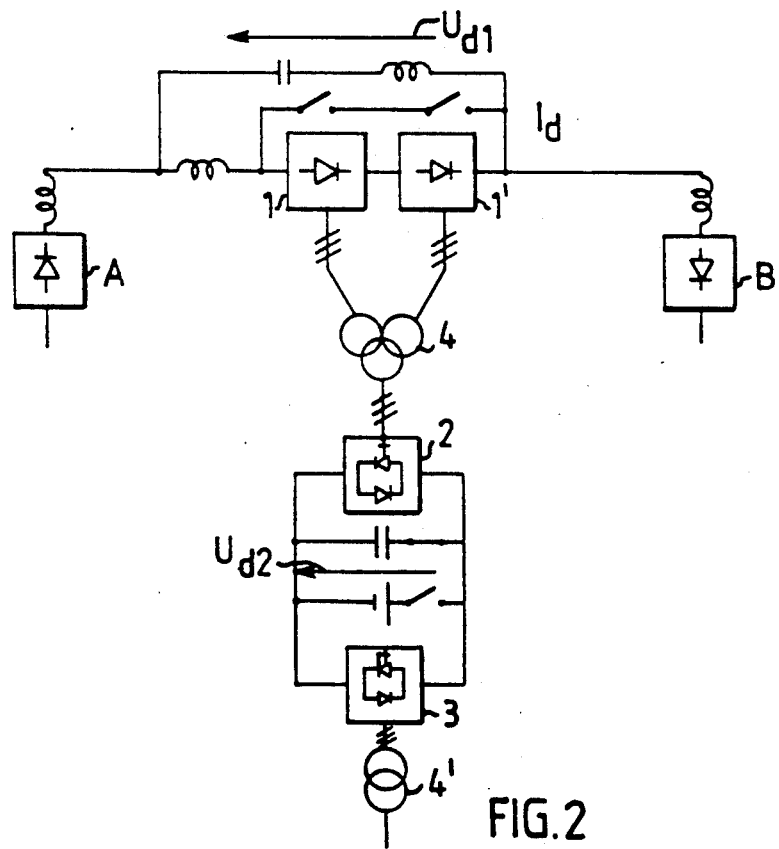
FIGS. 2 and 3 are more detailed circuit illustrations.

FIG. 2 illustrates symbolically an entire network including terminal stations A and B for the HVDC-line, and a power discharge system connected to one conductor in the line, which conductor may comprise one overhead conductor of a twin-conductor (not shown).

Figure 3:
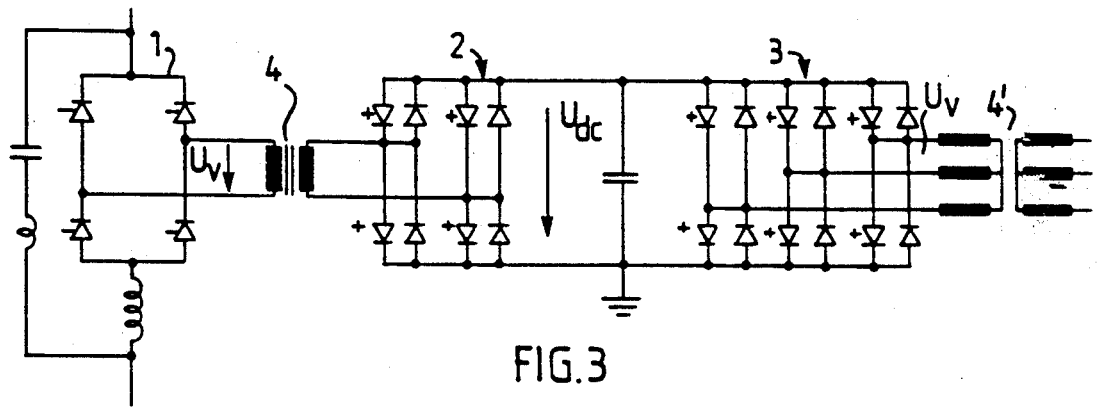

The systems illustrated in FIGS. 2 and 3 include thyristor valves for the converters 2 and 3, these valves being extinguishable by means of current pulses (GTO-type). The converter 2 illustrated in FIG. 2 is indicated as being voltage-stiff and force-commutated. At least one of the converters 1 or 2 must be force-commutated. The converter 2 is then connected, via the direct-current interlink, to the converter 3, which is force-commutated and connected directly to the alternating current network connected for distribution. By working with a relatively constant direct voltage, it is also possible to connect an energy-storage battery, which facilitates start-up procedures in the case of a "dead" alternating current network and which also makes it possible to avoid disturbances of short duration on the direct current line from disturbing the alternating current network, and vice versa. When the converter 3 is force-commutated, the connected network need not include synchronous machines. If the local network has no other power supply, the frequency in the network will be controlled unequivocally by the commutation frequency in the converter 3, which is also force-commutated. In its simplest variant, the converter 3 is controlled as a square-wave current converter. The fundamental-tone component $U_{v(1)}$ of the alternating voltage is therewith proportional to the d.c. voltage $U_{dc}$, i.e.

$$U_{v(1)} = K_u \cdot U_{dc} \qquad (1)$$

The proportionality factor $K_u$ is a fix constant for square-wave converters, but may also be controlled by pulse width modulation, by using two phase-displaced, six-pulse bridges or a so-called NPC-coupling. This is described in the monograph Ekström: "High Power Electronics HVDC SVC" (Stockholm 1989).

Described below is a steering and control system for the simple case when $K_{u1}$ is a constant, the a.c. voltage $U_{v1}$, and therewith the voltage in the local a.c. voltage network, being controlled by steering $U_{dc}$. On the other hand, if the system is constructed so that $K_u$ can be controlled, the voltage in the d.c. voltage interlink $U_d$ is steered towards a fixed value, which enables a battery to be connected to the interlink voltage.

Figure 4:
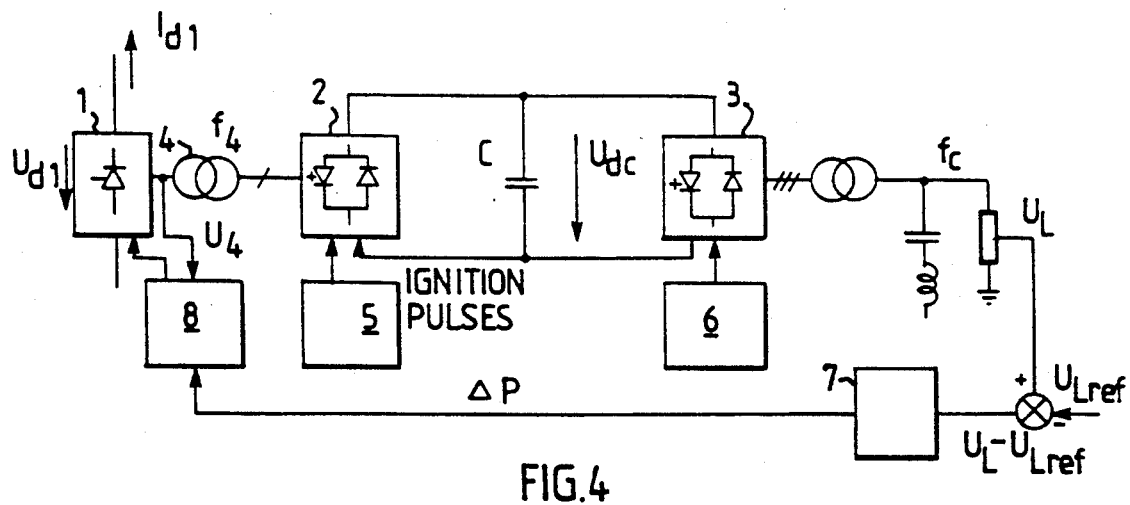
FIG. 4 is a block diagram illustrating the construction of a control system for the illustrated discharge system.

FIG. 4 illustrates in block form a steering and control system for the system illustrated in FIG. 1. In this case, the ignition systems for the converter 2 and the converter 3 are particularly simple, since it is assumed that these converters are solely steered to provide desired values of the frequencies $f_4$ and $f_L$.

The control systems 5 and 6 can, for instance, have the form of ring counters triggered by pulses having the frequencies $2 \times f_4$ and $6 \times f_L$ respectively.

The main problem is to steer $U_{dc}$, so that the desired a.c. voltage $U_L$ can be obtained in the local network. In the simplest variant, this network can be constructed as a feedback system according to FIG. 4, wherein the measured voltage $U_L$ is compared with the desired voltage $U_{Lref}$. When the measured voltage is excessively low, the voltage regulator 7 will calculate an appropriate addition to the input power P, which is supplied to the control device 8 for the converter 1. The measured voltage $U_4$ is also supplied to the control device 8. The control device may be configured in the manner illustrated for a HVDC converter according to Chapter 7 of the aforesaid monograph to Ekström. This converter is constructed so that the ignition pulses are delayed at positive P and are made premature in the case of a negative P. Delayed application of the ignition pulses to the converter 1 causes the ignition angle to increase and the extinguishing angle to decrease, which in turn results in an increase of the d.c. voltage $U_{d1}$ over the converter 1 at constant a.c. voltage $U_4$. When the direct current $I_{d1}$ is assumed to be constant, an increase in $U_{d1}$ will result in an increase in the power supplied to the capacitor C in the direct voltage interlink and therewith in an increase in the voltage $U_{dc}$ over said capacitor. For the purpose of preventing commutation errors in the converter 1, the control system 8, similar to the control system for the HVDC converter described in the aforesaid monograph to Ekström, is provided with a limitation such that the extinguishing angle can never be smaller than a predetermined smallest value.

A multiple of alternative embodiments are possible within the scope of the invention, as will be realized by the person skilled in this art. The degree of complication depends to a large extent on the power to be discharged or tapped-off in each particular case, and the aforedescribed example is primarily conceived for relatively low discharge powers, where the advantages afforded by the invention are thought to be most significant, although, as mentioned, the system can be constructed to some extent for higher power discharges, by using a three-phase/six-pulsed converter as the first converter or simply a twelve-pulse converter, so as to reduce the problems associated with filtering and disturbance elimination on the high voltage side.

I claim:

1. A system for discharging electrical power from a high-voltage direct-current (HVDC) transmission line to a local network, comprising:
- a first, single-phase converter bridge comprising semiconductor switches which are energized by signals and which are de-energized solely with current zero crossing, and a first, single-phase transformer having a primary winding connected to a HVDC line and a secondary winding;
- a second converter bridge connected to said secondary winding;
- a secondary direct voltage network connected to said second converter bridge;
- a third converter bridge connected to said secondary direct voltage network for generating an alternating current for said local network; and
- said second and said third converter bridges each comprise ON/OFF controllable semiconductor switches, and said first and said second converter bridges commutate with a frequency that is 2-4 times higher than the normal frequency of said local network and said third converter bridge commutates at the normal frequency of said local network.

2. A system as claimed in claim 1, wherein said second converter bridge is voltage stiff and further comprising a capacitor for shunting the direct voltage output of said bridge.

3. A system as claimed in claim 2, further comprising an accumulator battery and wherein said capacitor is connected in parallel therewith.

4. A system as claimed in claim 1, further comprising a plurality of converter bridges which are at least partially deactivatable and each one of which is capable of delivering a respective alternating current which contributes to the power supplied to said first transformer.

* * * * *

UNITED STATES PATENT AND TRADEMARK OFFICE
CERTIFICATE OF CORRECTION

PATENT NO. : 5,187,651

DATED : February 16, 1993

INVENTOR(S) : Ake Ekstrom

It is certified that error appears in the above-indentified patent and that said Letters Patent is hereby corrected as shown below:

On the title page, item [73], "Bourrc" should read --Boveri--.

Signed and Sealed this

Fifteenth Day of November, 1994

Attest:

BRUCE LEHMAN

*Attesting Officer*  *Commissioner of Patents and Trademarks*